(12) United States Patent
Kim

(10) Patent No.: US 8,528,966 B2
(45) Date of Patent: Sep. 10, 2013

(54) SHOCK ABSORBER MOUNTING PORTION STRUCTURE OF VEHICLE

(75) Inventor: Joo Nam Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/316,549

(22) Filed: Dec. 11, 2011

(65) Prior Publication Data

US 2013/0082482 A1  Apr. 4, 2013

(30) Foreign Application Priority Data

Oct. 4, 2011  (KR) .................. 10-2011-0100520

(51) Int. Cl.
 *B62D 25/08* (2006.01)
(52) U.S. Cl.
 USPC ............... 296/198; 296/97.22; 296/203.04; 296/204
(58) Field of Classification Search
 USPC ........... 296/198, 204, 203.04, 193.01, 187.1, 296/97.22, 187.03
 IPC ....................................... B62D 25/08
 See application file for complete search history.

(56) References Cited

U.S. PATENT DOCUMENTS

| | | | | |
|---|---|---|---|---|
| 2,417,324 A | * | 3/1947 | Rivard et al. | 296/198 |
| 4,252,245 A | * | 2/1981 | Kudo | 220/86.2 |
| 4,919,474 A | * | 4/1990 | Adachi et al. | 296/203.02 |
| 6,033,006 A | * | 3/2000 | Bovellan et al. | 296/97.22 |
| 7,281,756 B2 | * | 10/2007 | Fukushi et al. | 296/203.04 |
| 8,287,035 B2 | * | 10/2012 | Bufe et al. | 296/203.01 |
| 2010/0078970 A1 | * | 4/2010 | Kim | 296/198 |
| 2010/0133879 A1 | * | 6/2010 | Leonetti et al. | 296/193.08 |
| 2012/0242111 A1 | * | 9/2012 | Mildner et al. | 296/193.01 |

* cited by examiner

*Primary Examiner* — Glenn Dayoan
*Assistant Examiner* — Pinel Romain
(74) *Attorney, Agent, or Firm* — Morgan, Lewis & Bockius LLP

(57) ABSTRACT

A shock absorber mounting portion structure of a vehicle may include a quarter panel, a wheel housing inner panel coupled to the top of the quarter panel to form a wheel house, an inner support member coupled to an upper surface of the wheel housing inner panel and a portion of the quarter panel to form a closed space together with the wheel housing inner panel and the quarter panel, wherein the portion of the quarter panel may be disposed above the top of the quarter panel, an outer support member coupled to the quarter panel to form a closed space together with the quarter panel to correspond to the inner support member around the quarter panel, and a mounting bracket of which the top may be coupled to the wheel housing inner panel through a horizontal bonding surface so as to support the top of a shock absorber.

5 Claims, 4 Drawing Sheets

SHOCK ABSORBER MOUNTING PORTION STRUCTURE OF VEHICLE

CROSS-REFERENCE TO RELATED APPLICATION

The present application claims priority to Korean Patent Application No. 10-2011-0100520 filed on Oct. 4, 2011, the entire contents of which is incorporated herein for all purposes by this reference.

BACKGROUND OF THE INVENTION

1. Field of the Invention

The present invention relates to a shock absorber mounting portion structure of a vehicle, and more particularly, to a structure of a portion where a rear shock absorber and a fuel filler neck of the vehicle are installed.

2. Description of Related Art

Road noise generated according to a condition of a road while a vehicle travels is inputted into a vehicle body through a tire and a suspension device to have a bad influence on riders.

The road noise is delivered by vibrating a vehicle body panel through a portion of the vehicle body on which a shock absorber configuring the suspension device is mounted. Therefore, it is very important to secure the rigidity of the shock absorber mounting portion in order to insulate and interrupt the road noise.

FIG. 1 is a diagram showing a structure in which a shock absorber 500 configuring a rear suspension device of a vehicle is mounted on a vehicle body in the related art and FIG. 2 is a perspective view of a wheel housing inner panel 502 and a quarter panel 504. In particular, FIG. 2 shows a structure of the vehicle in which the top of the shock absorber 500 needs to be mounted adjacent to a portion where a fuel filler neck 506 for filling fuel is installed, and as a result, the top of the shock absorber 500 is mounted on the wheel housing inner panel 502 through a mounting bracket 508, the top of the wheel housing inner panel 502 is bonded to the quarter panel 504, and the fuel filler neck 506 is installed to penetrate the quarter panel 504 while being adjacent to the shock absorber 500.

In particular, the top of the mounting bracket 508 is coupled to the wheel housing inner panel 502 through a vertical bonding surface due to interference in the fuel filler neck 506 and a fuel line connected thereto. Such a coupling structure is difficult to secure sufficient rigidity because the coupling structure is relatively more disadvantageous than a structure in which the mounting bracket 508 is coupled to the wheel housing inner panel 502 through a horizontal bonding surface in providing rigidity with respect to the road noise inputted into the shock absorber 500.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a shock absorber mounting structure of a vehicle that can improve noise and vibration characteristics of the vehicle and improve merchantability through more effective interruption and insulation of road noise by sufficiently securing the rigidity of a portion to which the top of a shock absorber is coupled even when a portion of a vehicle body mounted with which the top of the shock absorber is positioned adjacent to a fuel filler neck and a fuel line.

In one aspect, the present invention provides a shock absorber mounting portion structure of a vehicle, including a quarter panel, a wheel housing inner panel coupled to the top of the quarter panel to form a wheel house, an inner support member coupled to an upper surface of the wheel housing inner panel and the quarter panel to form a closed space together with the wheel housing inner panel and the quarter panel, an outer support member coupled to the quarter panel to form the closed space together with the quarter panel to correspond to the inner support member around the quarter panel, and a mounting bracket of which the top is coupled to the wheel housing inner panel through a horizontal bonding surface to support the top of a shock absorber.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
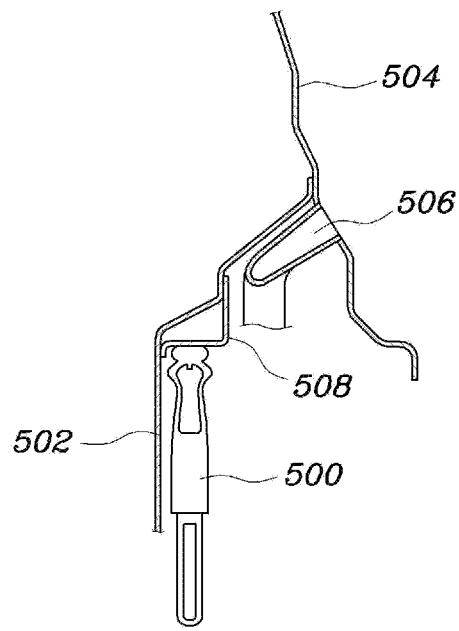
FIG. 1 is a diagram showing a shock absorber mounting portion structure of a vehicle in the related art.
Figure 2:
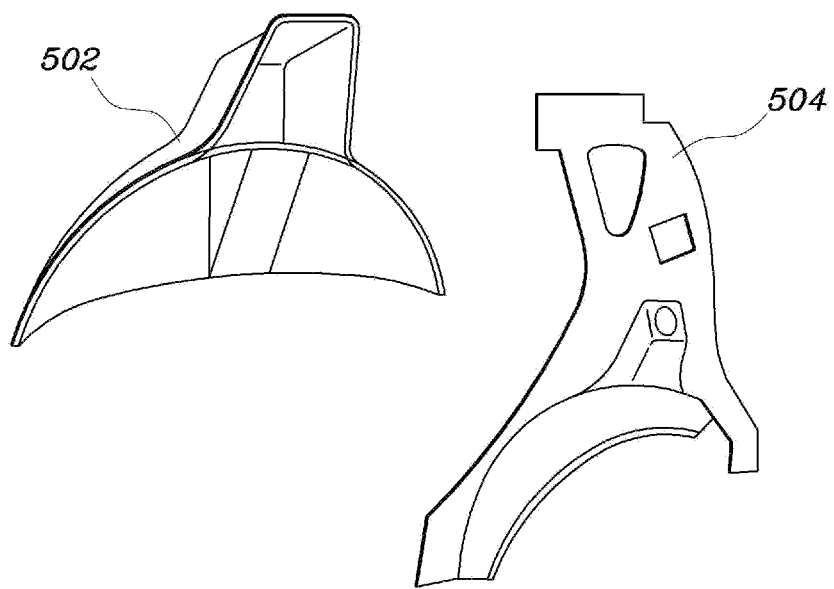
FIG. 2 is a 3D view of a wheel housing inner panel and a quarter panel of FIG. 1.
Figure 3:
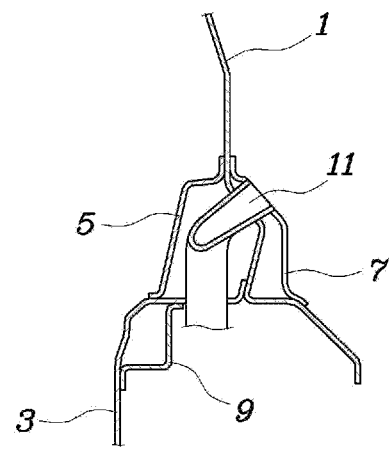
FIG. 3 is a diagram showing a shock absorber mounting portion structure of a vehicle according to an exemplary embodiment of the present invention.
Figure 4:
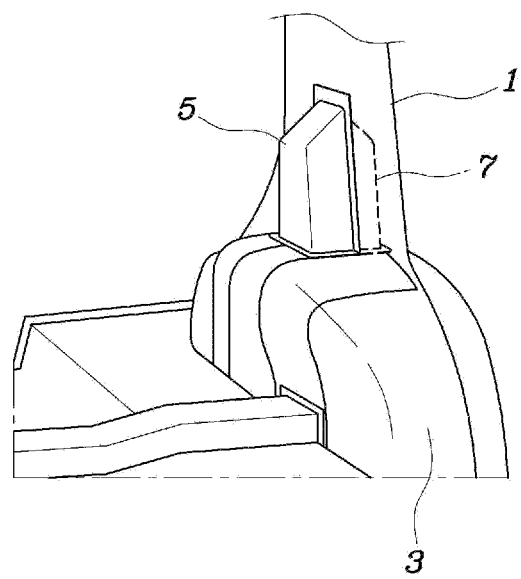
FIG. 4 is a diagram showing, in 3Ds, the structure of FIG. 3.
Figure 5:
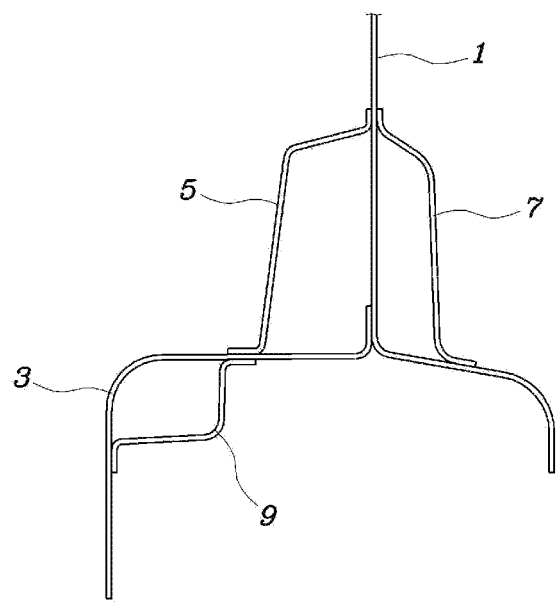
FIG. 5 is a cross-sectional view cutting the structure of FIG. 4 at a position different from FIG. 3.
Figure 6:
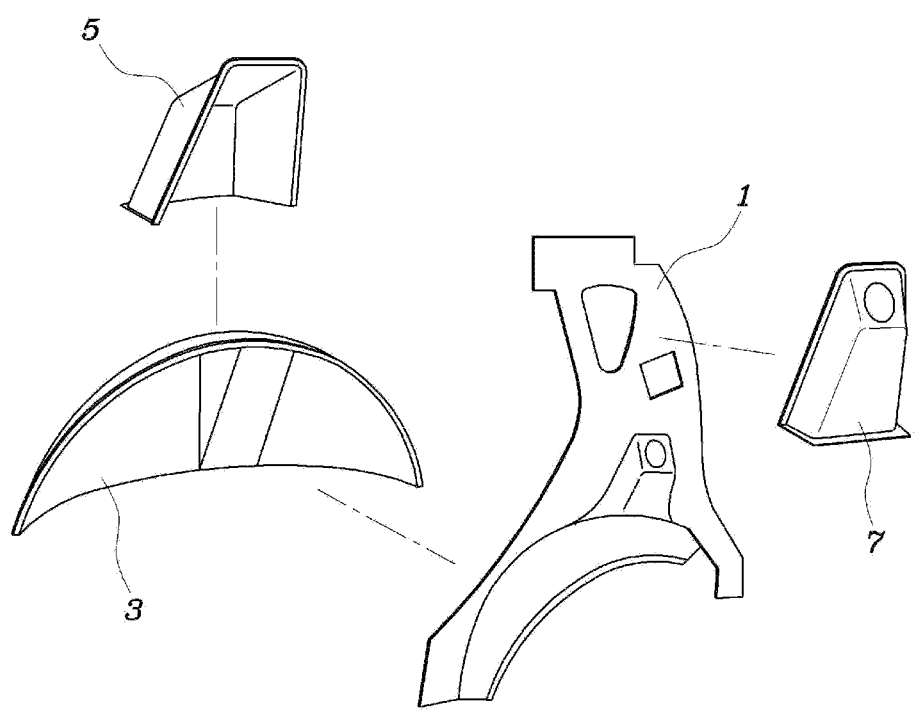
FIG. 6 is an exploded 3D view of primary components constituting the structure of FIG. 4.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Referring to FIGS. 3 to 7, a shock absorber mounting portion structure of a vehicle according to an exemplary embodiment of the present invention includes a quarter panel 1, a wheel housing inner panel 3 coupled to the top of the quarter panel 1 to form a wheel house, an inner support member 5 coupled to an upper surface of the wheel housing inner panel 3 and the quarter panel 1 to form a closed space together with the wheel housing inner panel 3 and the quarter panel 1, an outer support member 7 coupled to the quarter panel 1 to form the closed space together with the quarter panel 1 to correspond to the inner support member 5 around the quarter panel 1, and a mounting bracket 9 of which the top is coupled to the wheel housing inner panel 3 through a horizontal bonding surface to support the top of a shock absorber.

A fuel filler neck 11 and a fuel line connected thereto are installed to pass through the upper surface of the wheel housing inner panel 3 to penetrate the outer support member 7 through closed spaces formed by the inner support member 5 and the outer support member 7.

That is, in the related art, although the fuel filler neck and the fuel line are installed by using an upper space of the wheel house as it is as shown in FIG. 1, in the exemplary embodiment of the present invention, a wheel house space formed by the wheel housing inner panel 3 and the quarter panel 1 is additionally provided, the inner support member 5 and the outer support member 7 are provided in the upper space of the wheel house to install the fuel filler neck 11 and the fuel line connected thereto by using closed spaces formed thereby and the top of the mounting bracket 9 is coupled to a lower surface of the wheel housing inner panel 3 forming the wheel house space through a horizontal bonding surface to provide stronger rigidity against road noise inputted into the mounting bracket 9 from the shock absorber.

The quarter panel 1 has a cross-sectional shape bent outward to form the wheel house below a vertical surface and the top of the wheel housing inner panel 3 is coupled to the bent portion of the quarter panel 1 while forming bonding surfaces vertical to each other.

That is, the wheel housing inner panel 3 has purely only a structure in which the wheel house space is formed unlike the related art. A lower bent portion of the quarter panel 1 forms the wheel house together with the wheel housing inner panel 3.

The bottom of the inner support member 5 is coupled to the upper surface of the wheel housing inner panel 3 through the horizontal bonding surface and the top of the inner support member 5 is coupled to a vertical surface of the quarter panel 1 through the vertical bonding surface. The bottom of the outer support member 7 is coupled to an upper surface of a portion of the quarter panel 1, which is bent to form the wheel house through the horizontal bonding surface and the top is coupled to the vertical surface of the quarter panel 1 through the vertical bonding surface.

In particular, the top of the mounting bracket 9 is correspondingly coupled to a portion where the bottom of the inner support member 5 is bonded to the wheel housing inner panel 3 around the wheel housing inner panel 3 to be overlapped and coupled vertically around the wheel housing inner panel 3 to provide stronger rigidity against a load and vibration vertically applied from the mounting bracket 9.

Figure 7:
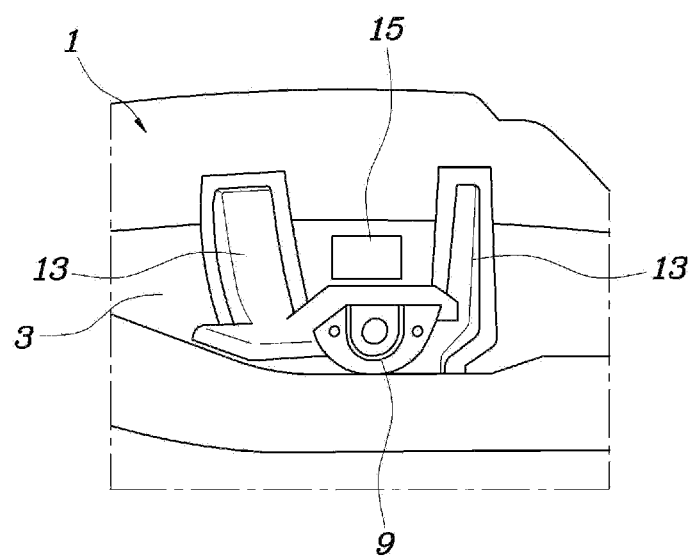
FIG. 7 is a diagram showing the structure of FIG. 4 viewed to the top from the inside of a wheel house.

Meanwhile, referring to FIG. 7, a plurality of wheel house reinforcing materials 13 coupled while extending from the lower surface of the wheel housing inner panel 3 to the lower surface of the quarter panel 1 is further provided in the wheel house formed by the wheel housing inner panel 3 and the quarter panel 1 and the mounting bracket 9 is coupled between the wheel house reinforcing materials 13, such that both sides are overlapped and coupled with the wheel house reinforcing materials 13 to secure stronger rigidity.

For reference, a hole 15 formed on the wheel housing inner panel of FIG. 7 allows the fuel filler neck or the fuel line connected thereto to pass.

As described above, the top of the mounting bracket 9 supporting the top of the shock absorber is coupled to the wheel housing inner panel 3 through the horizontal bonding surface and both sides are overlapped and coupled with the wheel house reinforcing material 13. While the bottom of the mounting bracket 9 is coupled to the wheel housing inner panel 3 through the vertical bonding surface, the mounting bracket 9 is coupled while forming another closed space together with the wheel housing inner panel 3, and as a result, sufficient support rigidity is secured against the load or vibration and the road noise applied from the shock absorber. Therefore, noise performance of the vehicle is improved and merchantability is improved due to more effective insulation and interruption of the road noise.

Further, holes are formed on the wheel housing inner panel 3 and the quarter panel 1 in order to install the fuel filler neck 11, and as a result, impurities may infiltrate a vehicle body from the wheel house space. In the structure according to the exemplary embodiment of the present invention, each of the wheel housing inner panel 3, the inner support member 5 and the quarter panel 1 and the outer support member 7 forms a dual partition structure, and as a result, the impurities can be effectively prevented from infiltrating into the vehicle body from the outside.

According to an exemplary embodiment of the present invention, it is possible to improve noise and vibration characteristics of the vehicle and improve merchantability through more effective interruption and insulation of road noise by sufficiently securing the rigidity of a portion to which the top of a shock absorber is coupled even when a portion of a vehicle body mounted with which the top of the shock absorber is positioned adjacent to a fuel filler neck and a fuel line.

Further, the shock absorber mounting portion structure of the vehicle according to the exemplary embodiment of the present invention serves to even effectively interrupt impurities from being inputted into the vehicle from a wheel house space by sealing the wheel house space in a double partition structure.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock absorber mounting portion structure of a vehicle, comprising:
    a quarter panel;
    a wheel housing inner panel coupled to a bent portion of the quarter panel to form a wheel house;
    an inner support member coupled to an upper surface of the wheel housing inner panel and a portion of the quarter panel to form a first closed space together with the wheel housing inner panel and the quarter panel, wherein the portion of the quarter panel is disposed above the bent portion of the quarter panel;
    an outer support member coupled to the quarter panel to form a second closed space together with the quarter panel to correspond to the inner support member around the quarter panel; and
    a mounting bracket of which a top is coupled to the wheel housing inner panel through a horizontal bonding surface so as to support a top of a shock absorber;
    wherein a fuel filler neck and a fuel line connected thereto are installed to pass through the upper surface of the wheel housing inner panel, the quarter panel, and the outer support member to penetrate through the first and second closed spaces formed by the inner support member, the wheel housing inner panel, the quarter panel, and the outer support member.

2. The shock absorber mounting portion structure of the vehicle of claim 1, wherein the quarter panel has a cross-sectional shape bent outward to form the wheel house below a vertical surface of the quarter panel and a top of the wheel housing inner panel is coupled to the bent portion of the quarter panel while forming bonding surfaces vertical to each other.

3. The shock absorber mounting portion structure of the vehicle of claim 2,
    wherein a bottom of the inner support member is coupled to the upper surface of the wheel housing inner panel through the horizontal bonding surface and a top of the inner support member is coupled to the vertical surface of the quarter panel through a vertical bonding surface; and
    wherein a bottom of the outer support member is coupled to an upper surface of the quarter panel, which is bent to form the wheel house through the horizontal bonding surface and a top of the outer support member is coupled to the vertical surface of the quarter panel through the vertical bonding surface.

4. The shock absorber mounting portion structure of the vehicle of claim 3, wherein the top of the mounting bracket is correspondingly coupled to a portion where the bottom of the inner support member is bonded to the wheel housing inner panel around the wheel housing inner panel.

5. The shock absorber mounting portion structure of the vehicle of claim 2, wherein a plurality of wheel house reinforcing materials coupled while extending from a lower surface of the wheel housing inner panel to a lower surface of the quarter panel is further provided in the wheel house formed by the wheel housing inner panel and the quarter panel and the mounting bracket is coupled between the wheel house reinforcing materials, such that both sides are overlapped and coupled with the wheel house reinforcing materials.

* * * * *